United States Patent [19]

Jacobs et al.

[11] Patent Number: 4,711,294
[45] Date of Patent: Dec. 8, 1987

[54] TEMPERATURE AND HUMIDITY CONTROL SYSTEM

[76] Inventors: Alphonse F. Jacobs, 4271 Longmoor Drive, Burlington, Ontario, Canada, L7L 5A4; James R. Paxton, 162 Manse Road, Scarborough, Ontario, Canada, M1E 3V1

[21] Appl. No.: 765,591

[22] Filed: Aug. 14, 1985

[51] Int. Cl.⁴ .................... F24F 3/153; B01D 47/06
[52] U.S. Cl. ........................... 165/19; 165/30; 165/60; 261/128; 261/142; 261/130; 261/131; 261/119.1; 236/44 R; 236/44 C; 62/3
[58] Field of Search ............ 165/3, 30, 60, 19, 20; 261/142, 119 R, 152, DIG. 34, 128-131; 236/44 R, 44 C, 44 B; 62/176.4, 309

[56] References Cited

U.S. PATENT DOCUMENTS

| | | | |
|---|---|---|---|
| 2,079,562 | 5/1937 | Olson et al. | 165/60 |
| 2,321,933 | 6/1943 | Olstad et al. | 261/129 |
| 2,338,382 | 1/1944 | Marlow | 165/20 |
| 2,379,932 | 7/1945 | Schoepflin et al. | 165/19 |
| 2,419,119 | 4/1947 | Christensen | 165/3 |
| 2,545,491 | 3/1951 | Ohlheiser | 165/3 |
| 2,825,680 | 3/1958 | Stutz | 261/DIG. 34 |
| 3,073,127 | 1/1963 | Schmerzler | 236/13 |
| 3,332,672 | 7/1967 | Schipper | 261/129 |
| 3,415,313 | 12/1968 | Olstad | 165/60 |
| 3,424,231 | 1/1969 | Truhan | 165/60 |
| 3,778,979 | 12/1973 | Friedling et al. | 261/119 R |
| 3,825,723 | 7/1974 | Roeser | 261/130 |
| 4,574,062 | 3/1986 | Weitman | 165/3 |

FOREIGN PATENT DOCUMENTS

| | | | |
|---|---|---|---|
| 0112549 | 9/1979 | Japan | 165/60 |
| 0084036 | 5/1984 | Japan | 165/60 |
| 482597 | 12/1975 | U.S.S.R. | 261/152 |

Primary Examiner—William R. Cline
Assistant Examiner—John K. Ford
Attorney, Agent, or Firm—McConnell & Fox

[57] ABSTRACT

A system for controlling the temperature and humidity of an enclosure such as a museum display case continuously extracts air from the enclosure, increases its humidity, cools it to a controlled temperature, at which point its humidity is 100%. The air is then heated and returned to the enclosure. By selection of the controlled temperature the relative humidity of the returned air may be determined.

9 Claims, 2 Drawing Figures

TEMPERATURE AND HUMIDITY CONTROL SYSTEM

BACKGROUND OF THE INVENTION

Field of the Invention

This invention relates generally to systems for controlling the temperature and humidity of critical environments particularly relatively small enclosed spaces.

DESCRIPTION OF THE PRIOR ART

It is essential under certain conditions to maintain a constant temperature and humidity in an enclosed space for example, in museum cases, microbiological growth chambers and other situations requiring precise control of temperature and humidity.

In the past, room air conditioning has been used in museums to try to maintain relatively constant temperature and humidity however, even when carefully designed, room air conditioning systems can only maintain a relative humidity range from 19% minimum in the winter to 56% maximum in the summer with a variation as much as 10% daily. In addition, a room air conditioning system is not convenient where various artifacts are to be displayed in the room which may, individually, require different climates. For example, some may require lower or higher relative humidity than others.

An alternative arrangement has been used in the past and that is to employ silica gel in a display case. This solution, however, is not only expensive from a labour point of view, it requires constant monitoring and regeneration. Tests have shown that the use of silica gel permits a stratification and non-uniform relative humidity from one portion of the display case to another. Further, silica gel is sensitive to temperature changes and can produce a 5% change in relative humidity in a short period of time.

SUMMARY OF THE INVENTION

In accordance with the present invention, the air to be maintained constant in temperature and humidity is extracted from the closed area, blown over a water bath with a velocity sufficient to cause surface turbulence causing cooling and humidity approaching 100%, then further cooled by a refrigeration unit. A portion of the cooled, saturated air is mixed with the incoming air and continuously circulated around this loop. The remainder of the air which is not recirculated is passed over a heater to increase the temperature of the air to the desired temperature. The heated air from the conditioning unit is then circulated back into the sealed chamber. By measurement and control of the cooled air temperature and the heated air temperature, the output air can be controlled to a precise level of humidity and temperature and thus the air within the enclosed space is maintained under constant conditions. By a suitable arrangement of the humidifying portion of the conditioning unit and the cooling portion of the humidifying conditioning unit, water condensed from the air during cooling is returned to the water bath thus eliminating the need for water make-up and also increasing the efficiency of the system by cooling the water bath and thus more effective cooling of the air impinging on the water bath.

BRIEF DESCRIPTION OF THE DRAWINGS

A clearer understanding of our invention may be had from examination of the following description and drawings in which.

DESCRIPTION OF THE PREFERRED EMBODIMENT

Figure 1:
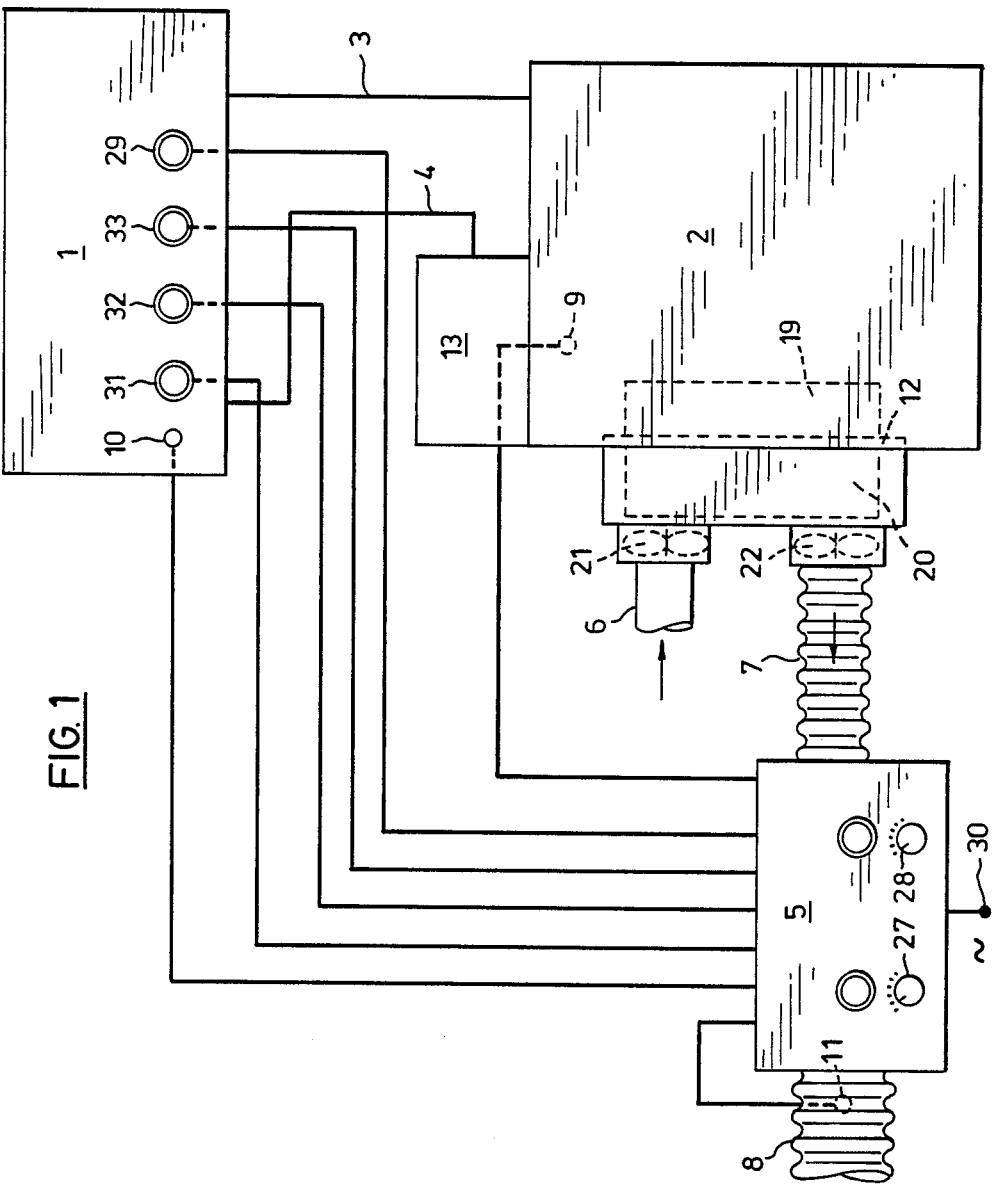
FIG. 1 is a schematic diagram of the system in accordance with the present invention and FIG. 2 is a diagramatic cross-section of the generator module of FIG. 1.

Considering first FIG. 1, there is seen a space 1 in which the atmosphere is to be controlled which is coupled, through ducts 3 & 4, to the generator 2. The system is controlled by the control module 5 which is electrically connected to both the space 1 and the generator 2 through a plurality of conductors here shown in single line only. Ambient air is supplied to the generator 2 at inlet 6 and after passing through hot side heat exchanger 20 of the heat pump 12 in the generator, the air passes out through duct 7 through the control module 5 and out to the ambient atmosphere through a duct 8. Temperature sensors 9, 10 & 11 measure the temperature of the air at various locations in the system in particular, sensor 9 measures the output temperature of the air from the cool side heat exchanger 19 of heat pump 12, sensor 10 measures the temperature of the air in space 1, and sensor 11 measures the output temperature of the air in duct 8.

Figure 2:
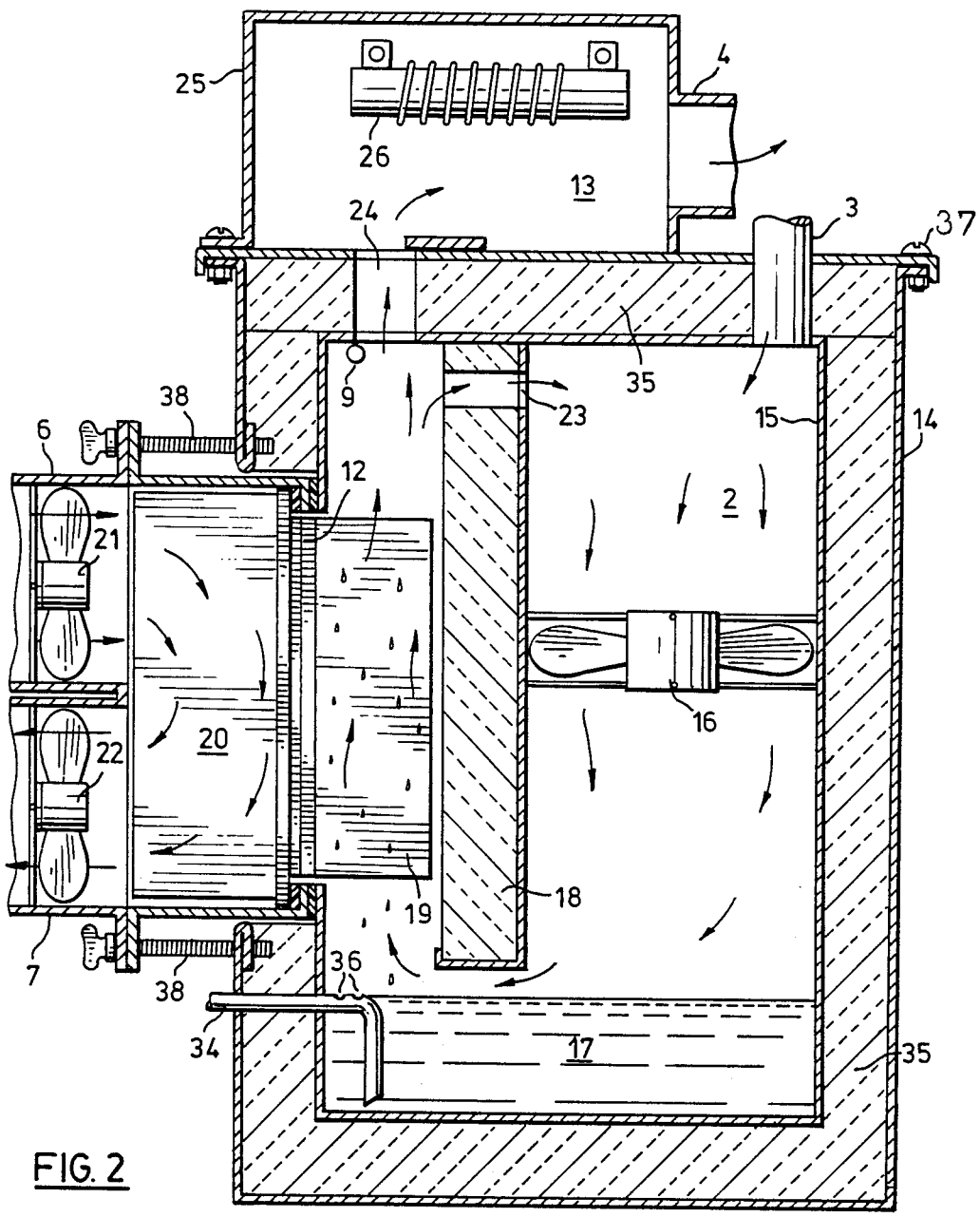

Turning now to FIG. 2, the structure of the generator 2 is here illustrated in cross-section. The generator comprises a double walled container, enclosure walls 14 & 15, preferrably of stainless steel, being the outer and inner walls of the container respectively. The air from space 1 is drawn into the right hand side of the generator through duct 3 by fan 16 and blown down and across the water bath 17 contained in the lower portion of the enclosure. The air then passes under wall 18, which divides the generator into two halves, and up through the fins of the cold side heat exchanger 19 of the solid state heat pump 12.

The hot side heat exchanger 20 of heat pump 12 includes fins and the ambient air from duct 6 is blown into these fins by fan 21 and extracted from the area by fan 22 and forced out through duct 7.

The air in the generator when passing through the heat exchanger fins 19 is cooled and, already being saturated with water from the water bath 17, becomes super saturated and moisture is deposited on the fins 19. Any drops of water so deposited accumulate and drip back down in the bottom of the generator enclosure and rejoin the water bath 17.

A portion of the air in the generator passes through orifice 23 in wall 18 and back through fan 16 to continue circulating around, across the water bath and back through the heat exchanger fins 19. The remainder of the air passes out through orifice 24 and into reheater manifold 25 which encloses an electrical heating element 26. The air then passes out of the manifold 25 through duct 4 and back into the space 1.

OPERATION

The control module 5 supplies electrical energy from a suitable source connected to terminal 30 to the heat pump 12 to maintain the temperature sensed by sensor 9 at a particular value as set by control 27 (FIG. 1). The control module also supplies electrical energy to the heating element 26 to maintain the temperature sensed by sensor 10 to a particular temperature as set by control 28. It may be assumed the relative humidity in space 1 will obey the equation $$RH_1 = RH_2 \cdot f\left(\frac{1}{t_2 - t_1}\right),$$

where $RH_1$ is the relative humidity within the space, $RH_2$ is the humidity at the output of the heat pump fins 19, $t_2$ is the temperature in the space and $t_1$ is the temperature at the output of the heat exchanger 19. Since the atmosphere within the generator, before the air passes out through orifice 24, is deemed to be saturated we may take $RH_2$ to be 100%. It will therefore be seen that if we select a particular temperature for $t_2$ the necessary value of $t_1$ to maintain a particular value of $RH_1$ is determined. The control 27 therefore may be calibrated in percent relative humidity while the control 28 is calibrated in temperature of space 1. The user therefore can adjust these two controls to the desired values for the enclosed space.

It has been found that with available components and proper selection, typically an adjustable relative humidity between approximately 25% and 100% in a 70° F. environment is conveniently obtainable and accurately maintained at the desired setting with accuracies within plus and minus 1% relative humidity. The temperature of the enclosed space may also be maintained with similar accuracy.

Naturally, these figures will vary depending upon various conditions, both size of the space, leaks into and out of the space and the variations of surrounding ambient temperature.

Suitable alarm indicators may be provided adjacent the controlled space and, as shown in FIG. 1, these indicators can include a "power on" indicator 29 that indicates that power from a suitable source has been applied to the control module. Sensor 11 measures the output temperature from the control module 5 and if it exceeds a certain set value shuts the system down. The indicator 31 indicates when the system is shut down due to over temperature. Indicator 32 indicates whether the temperature sensed by sensor 9 corresponds to the low temperature setting set by a control 27. If the sensed temperature falls outside the limits of the set temperature indicator 32 is illuminated. In a similar manner, indicator 33 indicates whether the temperature measured by sensor 10 falls within limits set by control 28.

In addition to these illuminated indicators of system failure an audible alarm may be provided which is energized in conjunction with any or all of the indicators. Since all the indicators will indicate failure or non-adherence to limits at the beginning of operation an automatic over-ride is provided in the control module. This over-ride shuts off the failure indicating system for a 60 minute period while the system is started up.

Because the system provides for humidification of the air before heating and dehumidification, it is possible to maintain high accuracy of the resulting humidity in the controlled space. Collection of the condensate from the cold heat exchanger of the heat pump and return of the condensate to the water bath at the bottom of the generator serves two purposes, it eliminates the need for make-up water in the system and also provides pre-cooled water for humidifying and pre-cooling the air. The system therefore is more efficient than it would otherwise be.

The provision of orifice 23, which permits recirculation of air within the generator, enables relatively high velocities within the generator without similar high velocity in the controlled space. This higher velocity within the generator allows more efficient humidification by causing turbulence at the surface of the water bath and more precise control of the air within the generator without subjecting articles within the controlled space to high rates of air flow. The balance between recirculated air and air supplied to space 1 is determined by adjusting orifice 24.

While the system has been described without reference to any particular size of units, it will be understood that selection of the various components will depend upon the volume and nature of the space to be atmospherically controlled. It has been found that with a space 1 of the order of 250 cubic feet with adequate sealing and no extreme ambient temperature swings, the humidity can be maintained anywhere between 30% and 80% relative humidity within plus or minus 1% with a generator and control installation of quite small size providing an air flow of 2 to 10 c.f.m. and using only 300 watts of power. This efficiency is improved by the construction of the wall of the generator enclosure which comprises outer wall 14, an insulation layer of rigid insulation 35 and a separate inner wall 15. The inner wall is therefore thermally isolated from the outer wall of the generator.

On initial start-up, sufficient water is poured into the unit through tube 34 to raise the level of the bath to the level of the tube inlet. Syphon breaker holes 36 prevent the water from syphoning out of the bath but are small enough to prevent undue loss of air from inside the generator out through tube 34.

As will be seen, the upper portion of the generator may be separated from the lower by undoing bolts 37 and lifting up the top section complete with its inner and outer walls 14 and 15 and insulation 35. Wall 18 is attached to the upper section and is simultaneously removed.

The heat pump 12 may also be removed by undoing bolts 38 which hold the heat pump assembly in compression against the inner wall 15.

The design of the generator is such as to provide good thermal isolation between the inside and outside, minimum air leakage from the chamber and yet permit disassembly for routine maintenance.

It will be noted that wall 18 closely approaches the surface of the water bath 17. The spacing is essential to efficient operation since it promotes turbulence at the surface of the bath which in turn improves heat transfer and evaporation.

While the system has been described in association with a solid state heat pump, it will be appreciated that other types of refrigeration units could be used, always recognizing the necessity, in many applications, of small size and low noise. The solid state pump has these advantages, but is relatively inefficient and it is therefore essential that the remainder of the system make up for this inefficiency by effective use of water bath cooling and cold water reclaimation.

No details of control module 5 have been provided since many possible arrangements will occur to those skilled in the art. One possible arrangement for example, would be to produce a signal from control 28 similar to the signal from sensor 10, compare the two signals and produce a difference signal. The energy supplied to heating element 26 would be in the form of a train of pulses of constant amplitude and period, each pulse having a duration determined by the instantaneous value of the difference signal. If the difference signal fell outside a particular range, indicator 33 would be energized.

What is claimed is:

1. Apparatus for controlling the temperature and humidity of air within an enclosed space comprising:
   (a) a thermally insulated chamber;
   (b) a water bath at the bottom of said chamber;
   (c) a partial wall extending from the top of said chamber to a point near the surface of said water bath dividing said chamber into a first side and a second side;
   (d) inlet means to conduct air from said enclosed space to the upper part of said first side of said chamber and outlet means to conduct air from the upper part of the second side of said chamber to said enclosed space;
   (e) a fan mounted part-way down said wall on said first side to induce a flow of air down said first side and under said wall and over said water bath;
   (f) means in said second side of said chamber to cool said flow of air to a predetermined temperature;
   (g) an opening in said wall above said fan permitting a first portion of said flow of air to return from the second side of the chamber to the first side of the chamber;
   (h) wherein said outlet means permits a second portion of said flow of air to return to said enclosed space; and
   (i) means to heat said second portion of said flow of air to a predetermined temperature.

2. The apparatus as claimed in claim 1 wherein said means to cool said flow of air comprises a finned heat exchanger mounted with its fins vertical in the second side of said chamber.

3. The apparatus of claim 1 wherein said outlet means to conduct air from the chamber to said enclosed space is an adjustable orifice.

4. The apparatus of claim 1 wherein said means to cool said flow of air is an electrically operated heat pump.

5. The apparatus of claim 4 wherein said means to heat that portion of the air flow returning to said enclosed space is an electrical heater.

6. The apparatus of claim 5 including means to control energization of said heat pump and said electrical heater.

7. The apparatus of claim 6 including means to measure the temperature within said enclosed space.

8. The apparatus of claim 6 including means to measure the temperature of the said second air flow after cooling.

9. The apparatus of claim 7 or 8 including means to indicate system failure.

* * * * *